June 3, 1930.  W. BLASKEWITZ  1,760,869
FIRE POT STRUCTURE
Filed Jan. 4, 1929   2 Sheets-Sheet 1

INVENTOR.
William Blaskewitz
BY
Stuart C. Barnes
ATTORNEY.

June 3, 1930. W. BLASKEWITZ 1,760,869
FIRE POT STRUCTURE
Filed Jan. 4, 1929 2 Sheets-Sheet 2
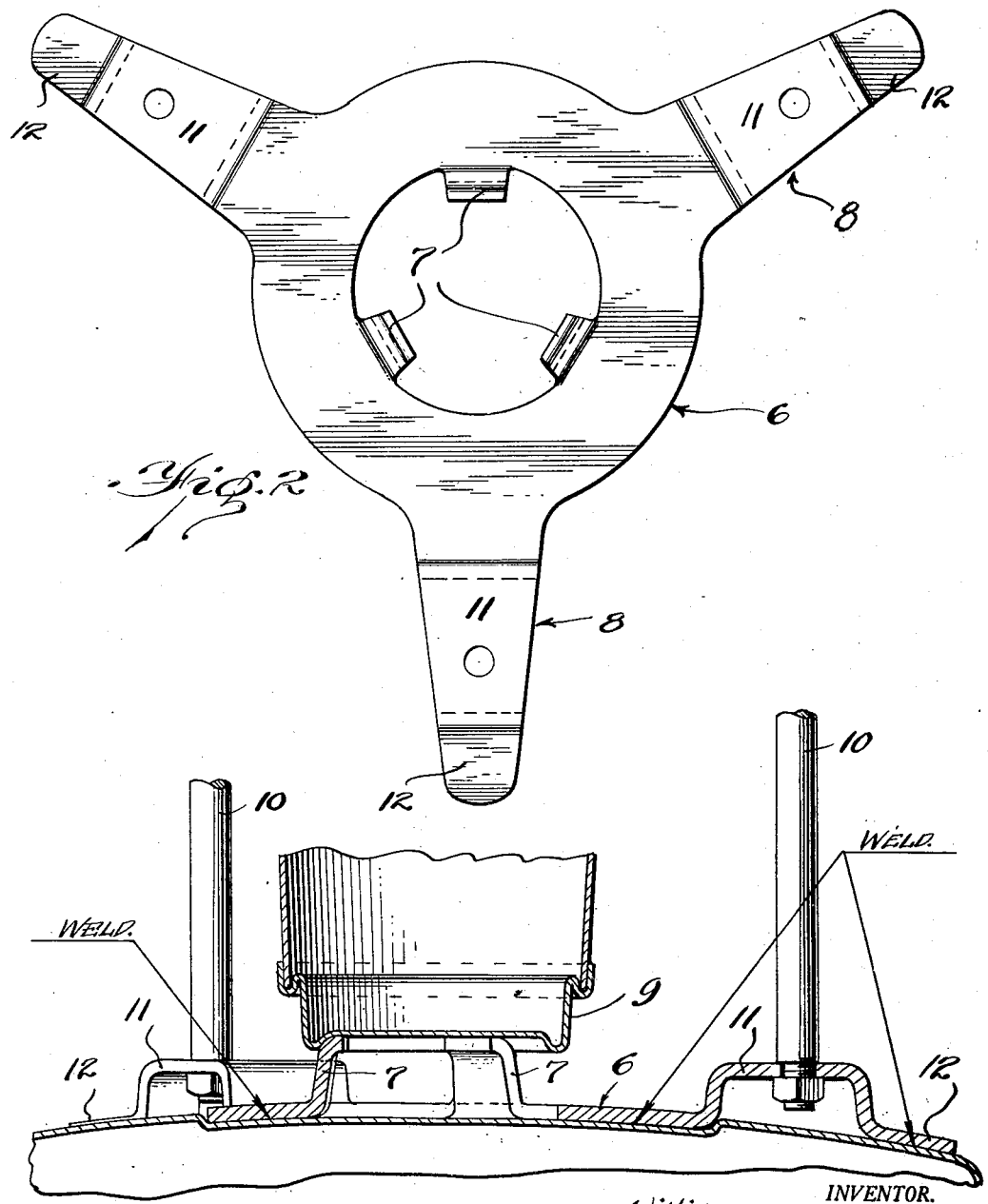
INVENTOR.
William Blaskewitz
BY
Stuart C. Barnes
ATTORNEY.

Patented June 3, 1930

1,760,869

UNITED STATES PATENT OFFICE

WILLIAM BLASKEWITZ, OF DETROIT, MICHIGAN, ASSIGNOR, BY MESNE ASSIGNMENTS, TO CLAYTON AND LAMBERT MANUFACTURING COMPANY, OF DETROIT, MICHIGAN, A CORPORATION OF DELAWARE

FIRE-POT STRUCTURE

Application filed January 4, 1929. Serial No. 330,281.

This invention relates to fire pot structure, and has to do particularly with a fire pot having a tank base, a top plate and burner, and simple and compact means for rigidly positioning and supporting the top plate and burner structure above the tank.

In the design and fabrication of fire pots, it has been customary to provide a top plate or grid which is positioned at a predetermined point above the tank base. In most all fire pots, the top plate carries or positions a shield which surrounds the burner and also is adapted to directly or indirectly receive the member or members to be heated. As fire pots are subjected to unusually severe service in operation, a large percentage of the knocks and bumps are received by the top plate, with the result that any bending or distorting of the same is quite detrimental to the proper operation of the fire pot and the correct application of the flame. Furthermore, in addition to a rigid, compact, structure, it is also desirable to have a tank super-structure which is easily assembled or disassembled.

Some types of fire pots, such as that disclosed in the patent of Groehn No. 1,701,180 dated February 5, 1929, are so designed as to clamp the burner shield between the top plate and the fuel tank, whereby the shield not only serves as a spacing member but presents a much more compact and rigid structure, due to the fact that the shield is clamped between the top plate and the tank, in addition to the fact that the clamping bolts extend between the top plate and a suitable spider arrangement on the tank.

It is the object of the present invention to provide a very simple addition to fire pots of the type described in the above Groehn patent; such simple addition consisting of extending the spider arms and forming the same into a complete inverted U-shape, whereby each end of such U-shaped portion may be rigidly secured to the top of the tank, adding additional strength to the reinforcing spider member and materially increasing the rigidity of the entire structure.

A further feature of the present invention resides in the provision of a spider member, the extreme ends of the arms of which are positioned at and spot welded to the strongest part of the tank. This extending and positioning of the spider arms not only greatly increases the rigidity of the entire structure, but also maintains the shield and burner structure in positive vertical alignment, which is much more important than maintaining the burner structure in axial alignment.

In the drawings:

Fig. 2 is a plan view of the spider member, and showing the manner of forming the ends of the legs thereof so as to form U-shaped brackets.

Fig. 3 is a fragmentary sectional view taken through one of the legs of the spider member.

Figure 1:
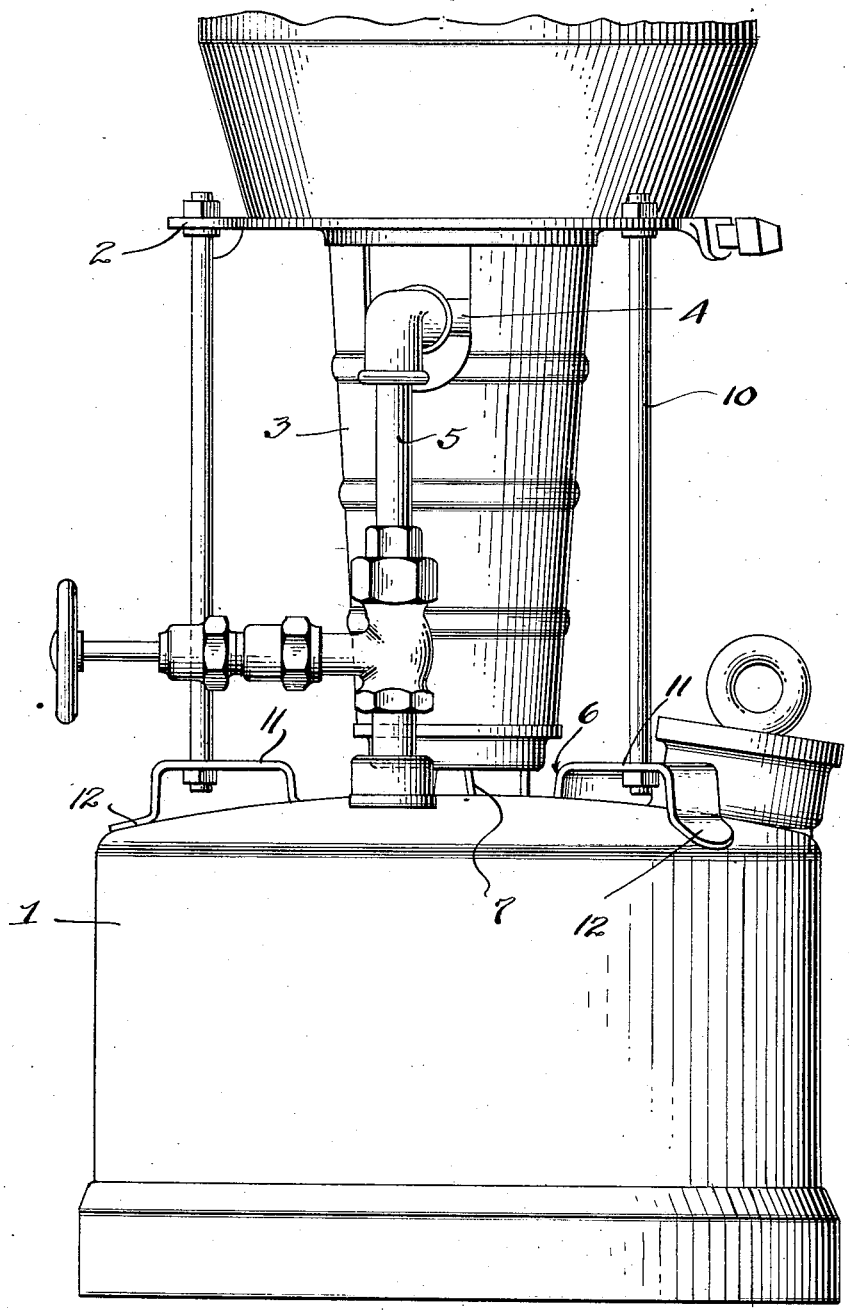
Fig. 1 is a front elevation of a fire pot embodying the present invention, and showing in particular the preferred manner of forming the legs of the spider member.

In the structure shown in the drawings, as embodying the present invention, the standard parts thereof generally comprise a fuel tank 1 serving as a base, a top plate 2, a shield member 3, and the burner 4. The top plate, due to its position and due to the fact that it is adapted to directly receive the weight of the articles to be heated, is subjected to many impacts and to many outside forces from all directions.

The vertical alignment of the burner structure 4, whether it be of the coil burner type or any other type, is very important, and while the axial alignment of the burner 4 may be changed somewhat by moving the conduit 5, the vertical alignment of the burner 4 must be maintained if proper preheating and proper location of the flame blast is desired. It is very important that the tank 1 be provided with as few openings as possible so as to keep all possibility of leakage down to a minimum. Therefore, in order to protect the burner structure and to increase the rigidity of the entire superstructure above the tank, I preferably utilize a spider member 6 which is preferably provided with the inwardly extending shield supporting legs 7 and the outwardly extending legs 8.

The inwardly extending legs 7 of this spider arm are preferably so shaped as to centrally locate and receive a cup member 9 which in turn is adapted to receive a lower edge of the shield member 3. Suitable bolts 10 are adapted to connect the legs 8 of the spider with the top plate, and shoulders at each end of the bolts 10 are preferably so shaped that when the nuts thereon are tightened the top plate is drawn downwardly so as to clamp the shield between the lower end of the top plate and the spider. This produces a very rigid super-structure and the only connection between the super-structure and the tank is by means of the spider member 6 which preferably fits into a depression in the tank, as best shown in Fig. 3, and which is also preferably spot welded thereto.

So much of the structure just described is substantially shown in said patent to Groehn 1,701,180. However, I have found by simply extending the legs 8 of the spider member 6, so as to form a complete channel or inverted U-shaped member 11, that a much stronger and rigid super-structure is provided. The extreme ends 12 of each leg member 8 of the spider is positioned directly above the strongest part of the tank; that is, directly adjacent the portion of the tank which connects the top and side walls. This takes the greater portion of the strain away from the top central part of the tank.

The portions 12 of the spider member are preferably spot welded to the tank, as best shown in Fig. 3, and inasmuch as such portions 12 are positioned at the strongest part of the tank, it will be seen that they offer much more reinforcement for the bolts 10 and the top plate than the other portion of the spider member which extends inwardly from the bolts and is spot welded to the central part of the tank. By extending the legs, as shown, and spot welding the same at their outer end to the strongest part of the tank, it will be obvious that the top plate is so reinforced as to prevent it from bending either up or down; that is, regardless of whether the blow received by the top plate is from a downwardly direction or from an upwardly direction, it will be positively reinforced.

It will thus be seen that with this method of reinforcement, it will be impossible to bend or distort the top plate or to affect the vertical alignment of the burner member without actually bending the rods 10 themselves. It will, furthermore, be obvious that this added reinforcement is not obtained only because of the extensions on the spider arms and the forming of the U-shaped portion thereof, but more particularly because the outer ends of each are bent downwardly and contact with the tank at the strongest part thereof, whereby the impacts of substantially all the blows received by the upper part of the super-structure are received by that portion of the tank which is best able to withstand the same.

What I claim is:

1. Fire pot structure, comprising a tank, a burner mounted on the tank and a shield surrounding the burner, a spider member having the central portion thereof in contact with the bottom part of the shield and with the central top portion of the tank, a top plate, means extending between the legs of the spider and the top plate for clamping the shield therebetween and for positioning the top plate, the ends of each leg of the spider being in reinforcing contact with the top of the tank and adjacent the outer edge thereof.

2. Fire pot structure, comprising a tank, a burner mounted thereon, a shield surrounding the burner, a top plate, a spider member having a central portion in contact with the central top part of the tank, and lugs positioned and contacting with the shield member, a plurality of legs extending from the central part of the spider radially outwardly and formed to provide inverted substantially U-shaped portions adjacent the outer periphery of the top of the tank, the ends of said U-shaped portions being in reinforcing contact with the tank at said periphery, and means connecting the U-shaped portions of the spider legs with the top plate for positioning the top plate and clamping the shield between the top plate and the lugs of the spider.

3. Fire pot structure, comprising a tank, a burner mounted thereon, a shield surrounding the burner, a top plate, a spider member having a central portion in contact with the central top part of the tank, and lugs positioned and contacting with the shield member, a plurality of legs extending from the central part of the spider radially outwardly and formed to provide inverted substantially U-shaped portions adjacent the outer periphery of the top of the tank, means connecting the U-shaped portions of the spider legs with the top plate for positioning the top plate and clamping the shield between the top plate and spider, the outer end of each U-shaped portion of each leg contacting with the tank adjacent the edge between the top of the tank and the side wall thereof, whereby that portion of the tank adjacent the top of the side walls will receive any impacts imparted to the top plate or top structure of the fire pot.

4. Fire pot structure, comprising a tank, suitable structure including a top plate and shield member, a spider having a central portion secured to the top central part of the tank and also receiving the bottom of the shield member, a plurality of legs extending outwardly from said central portion of the spider member and formed to receive the bottom ends of rods extending between the top plate and the spider member, the outer ends of each leg member of the spider member being bent downwardly to contact with and being secured to the top part of the tank adjacent the periphery thereof.

5. Fire pot structure, comprising a tank forming a base, super-structure positioned above the tank including a top plate, a plurality of supporting and clamping members extending downwardly from the top plate, and a plurality of substantially U-shaped members for receiving and supporting the lower ends of said supporting and clamping members, one leg of each of said U-shaped members being rigidly secured to the tank adjacent the periphery thereof.

6. Fire pot structure, comprising a tank having top and side walls and forming a base, super-structure positioned above the tank including a top plate, a plurality of supporting and clamping members extending downwardly from the top plate, and a plurality of substantially U-shaped members for receiving and supporting the lower ends of said supporting and clamping members, said substantially U-shaped members extending radially outwardly from the top center part of the tank and each leg thereof being spot welded to the tank, the outer leg of each member being spot welded to the tank adjacent the edge between the top and side walls.

In testimony whereof I affix my signature.

WILLIAM BLASKEWITZ.